/ Patented Oct. 6, 1936

2,056,594

UNITED STATES PATENT OFFICE 2,056,594

LUBRICATING JELLY

Henry A. Ambrose, Pittsburgh, Pa., assignor to Gulf Research & Development Company, Pittsburgh, Pa., a corporation of Delaware No Drawing. Application March 4, 1935,
Serial No. 9,321

14 Claims. (Cl. 196—151)

This invention relates to lubricants and more particularly to a class of lubricants existing as thixotropic jellies; being jellies during quiescence while liquefying or thinning during agitation.

In lubrication of movable mechanical parts of machines and the like there are frequently encountered certain operating conditions neither readily adaptable to oil lubrication nor to grease lubrication. One such condition, for instance, is in the packing and lubrication of ball bearings.

After manufacture of the balls which are used in ball bearings, it is customary for the manufacturer to pack them in a relatively high melting grease not liquid enough to drip or run and then ship them to the point at which they are to be assembled between the races making up the bearing. Such high melting greases are not suitable for lubrication of ball bearings under all conditions and consequently it is frequently necessary to remove such a grease and substitute some other lubricant before the bearing is placed in use. Such substitution is tedious and wasteful and there is a demand for a lubricant having a consistency suitable for packing balls prior to assembly in the bearing structure and, in addition, having the characteristics of a desirable lubricant for the bearing under operating conditions. A thixotropic composition normally a grease but liquefying in the bearing meets these requirements. In the present invention I have provided lubricants which meet the demand for proper consistency for packing combined with desirable characteristics for lubrication under operating conditions.

In the lubrication of ball bearings and other open bearing surfaces, it is desirable that the lubricant should remain between the working parts and not be lost by dripping or leakage when motion stops; when a machine shuts down. But it is also desirable that the lubricant be of relatively low viscosity under operating conditions. Liquid oil is not suitable because it will leak away and be lost, while the usual greases are mostly too viscous and have the added disadvantage of forming hard granular masses when in use. These granular masses are destructive to the bearing elements.

In the past, petrolatum has been used to lubricate open bearing surfaces, but petrolatum has the disadvantage of melting or turning liquid at relatively low temperatures, that is to say temperatures around 123° F. Being a mixture of nearly related hydrocarbons it has no sharp melting point but it may be said to be definitely liquid above 123° F. This fact makes undesirable the use of petrolatum in those applications where leakage is objectionable and the temperature is above that at which petrolatum turns liquid. Such applications are many. In the present invention I have provided thixotropic lubricants which are of jelly consistency, which are higher melting than petrolatum and which are hence adapted for application to open bearing surfaces at higher temperatures than is petrolatum.

Certain of my new lubricants find especially advantageous use in the lubrication of certain parts of cash registers where there is a demand for a lubricant which will retain the abovenamed desirable characteristics when subjected to opposite extremes of temperature. Cash registers may sometimes be placed out of doors in cold weather and at other times be placed over radiators. If petrolatum is used as a lubricant, the mechanism frequently sticks when cold and when too hot the petrolatum is lost by dripping and the parts are then no longer properly lubricated.

My new lubricants, at least in part, owe their advantages to the fact that they remain of jelly consistency and consequently do not drip under ordinary conditions and, in addition, they exhibit thixotropic properties under operating conditions. A thixotropic jelly is one which when undisturbed maintains its normal consistency but which when disturbed, as by stirring or agitation, becomes more or less fluid, re-gelling again upon cessation of the disturbance. It is not satisfactory to determine the resistance to flow of such a jelly below its melting point by the use of an efflux type viscometer because such determinations will not accurately portray the resistance to flow when the jelly is under conditions to which it is subjected in use. A liquid resulting from the agitation of a thixotropic jelly below its melting point is not directly comparable with a liquid resulting from melting it. Ordinarily, therefore, a rotary type viscometer (such as the Hatschek modification of the Couette viscometer) is employed. It can be operated at a definite rate of shear until the apparent viscosity reaches an equilibrium value. By "apparent viscosity" I mean the viscosity of the jelly as measured by the rotary type viscometer at any given temperature below the melting point and given rate of shear when those two conditions are kept constant and the indicated viscosity has reached an equilibrium value.

In the specification and in the appended claims, the abbreviation S. U. V. is used to denote viscosity measurements as determined by the Saybolt universal viscosimeter, the term wax melting point is used to denote the method of determining melting points of paraffin wax as given in the 1933 Book of Standards of the American Society of Testing Materials, part II, pages 836 to 839 inclusive; and the term jelly melting point is used to denote the method of determining melting points of petrolatums as given in the same book on pages 840 and 841. The term viscosity index is used to denote the relation of viscosity to temperature as described by Dean and Davis in "Chemical and Metallurgical Engineering", volume 36, page 618.

Under certain conditions there is a demand for a thixotropic lubricating jelly having a low apparent viscosity at temperatures substantially below the melting point, which point is the temperature at which the jelly becomes liquid. In other conditions there is a demand for a lubricating jelly having a higher melting point than petrolatum, but having approximately the same viscosity at low temperatures as petrolatum.

Among the objects attained in the present invention is the provision of a thixotropic lubricating jelly having the desired low viscosity and slight change of viscosity with temperature and, in addition, having a melting point higher than petrolatum.

Another object attained by the present invention is the provision of a lubricating jelly having a lower apparent viscosity than petrolatum and at the same time undergoing but slight change of viscosity with temperature and having a melting point higher than petrolatum.

A third object attained by the present invention is the provision of a lubricating jelly having the above named desirable characteristics and in addition having greater resistance to oxidation than does petrolatum.

In its general aspects my invention comprises an improved lubricating jelly, synthetically prepared by mixing wax of high wax melting point with a more or less liquid petroleum lubricating oil, the product being characterized by its high jelly melting point and thixotropic properties.

I have found that hard high melting waxes in admixture with normally liquid lubricating oils, in certain proportions, give jellies evincing useful thixotropy (Journal of Rheology, 1931, 2, pages 5 and 141).

As one illustration of my invention, a relatively high melting amorphous wax derived from petroleum is freed from any oil associated therewith by centrifuging or any other suitable process and this oil-free amorphous wax is blended with a particular type of lubricating oil to give a synthetic lubricating jelly having the desired characteristics.

The following examples are illustrative of various modifications of the invention and present it in its more specific aspects:

*Example I*

According to my invention in the preparation of a lubricating jelly having a low apparent viscosity at a temperature substantially below the melting point and a melting point higher than petrolatum, I take 20.1 parts by weight of an amorphous wax, substantially free of oil and having a wax melting point of 155° F. With this amorphous wax is mixed 61 parts of a lubricating oil having a viscosity of 100 seconds S. U. V. at 100° F. and a viscosity index of 95. This synthetic mixture has a jelly melting point of about 131.6° F. which is about 8.6° F. higher than the melting point of ordinary Mid-Continent petrolatum and has an apparent viscosity at 32° F. approximately one-tenth that of ordinary petrolatum. The product is an excellent lubricant for cash register keys.

In some instances, I improve the consistency of a jelly such as that just described by the addition of a small proportion of so-called petroleum ceresine, which is a refined, high-melting wax derived from rod wax. For example, I find the consistency of the jelly prepared in the above-named example to be made less granular by the addition of 0.5 part of petroleum ceresine having a melting point of about 160° F.

In a particularly advantageous embodiment of my invention I use a lubricating oil obtained from treatment of lubricating stock with aluminum chloride. For example, if the oil used in the preparation of the above example be an oil previously refined with aluminum chloride, I find that the synthetic jelly produced is more resistant to oxidation than if an oil is used which has not been treated with aluminum chloride. Another advantage of using aluminum chloride treated oil is that apparently the resultant mixture is rendered more stable.

*Example II*

In the preparation of a lubricating jelly undergoing relatively slight change of viscosity with temperature and having a jelly melting point substantially higher than petrolatum, I mix an oil of high viscosity index with substantially oil-free amorphous wax derived from wax-bearing lubricating oil and with a high melting petroleum ceresine. Thus, when 61 parts by weight of a lubricating oil with viscosity of 100 seconds S. U. V. at 100° F. and viscosity index of 95 were mixed with 20.1 parts of amorphous oil-free wax having a wax melting point of 155° F. and 10 parts of petroleum ceresine having a wax melting point of 160° F., the synthetic jelly so formed had a jelly melting point of about 140° F. which is some 17° F. higher than that of petrolatum.

I have found that the melting point of a jelly mixture can be even further raised by the use of some high melting crude shellac wax, which substance is a by product in the manufacture of shellac and may be obtained from dealers in waxes.

*Example III*

As an example of the preparation of such a high melting mixture, I have taken 61 parts by weight of oil with a viscosity of 100 seconds S. U. V. at 100° F. and viscosity index of 95 and mixed with it 20.1 parts amorphous, substantially oil-free wax having a wax melting point of 155°, F. and 5 parts of crude shellac wax having a wax melting point of about 165° F. The resultant jelly had a jelly melting point some 31° F. higher than that of petrolatum.

I likewise find crude Montan wax an advantageous addition to jelly mixtures to raise their jelly melting points. Montan wax has the desirable and unlooked for property of substantially raising the melting point of a jelly mixture even when added thereto in relatively small amounts such as between 1 and 2 per cent by weight. This property is clearly brought out in the following illustrative examples:

Example IV

On mixing 61 parts by weight of 100 second S. U. V., 95 viscosity index, petroleum oil with 20.1 parts amorphous oil-free wax having a wax melting point of 155° F. and adding 5 parts crude Montan wax having a wax melting point of 170° F. I obtained a thixotropic jelly having a jelly melting point of 161.4° F., 38.4° F. higher than that of petrolatum, and an apparent viscosity appreciably lower than that of petrolatum.

By comparing Example IV with Example I it will be observed that the only difference in make up is in the 5 parts of Montan wax present in Example IV, but absent in Example I. However, this small addition of Montan wax raised the jelly melting point of the mixture 29.8° F. over that of the mixture described in Example I.

Example V

If 1.0 part by weight crude Montan wax having a wax melting point of 170° F. be added to the jelly obtained in Example II, the jelly melting point of the mixture is raised from 140° F. to 157.0° F. Thus the addition of 1.1 per cent by weight crude Montan wax raised the jelly melting point 17° F.

In the preparation of the jellies described in the foregoing examples, the mixed ingredients were in every instance heated above the melting point of the highest melting ingredient to aid in blending. The melt was then allowed to cool and form the final jelly product. In the preparation of the jellies described in Examples IV and V, the ingredients were heated to 180° F. and filtered while hot to remove some of the impurities present in the crude Montan wax. The filtrate was then allowed to cool and form the final jelly product. I find that different samples of crude Montan wax vary slightly in their wax melting point. Samples melting between 167 and 171° F. have been found satisfactory.

The following example is illustrative of the fact that waxes other than those of petroleum origin may be used alone with lubricating oil in the synthesis of high melting thixotropic lubricating jellies. It is also illustrative of the fact that variations in color of the products may be obtained by varying the starting material. In general, the more the starting material is refined, the less the color imparted to the final product.

Example VI 85.1 parts by weight of a petroleum lubricating oil with viscosity of 100 seconds S. U. V. at 100° F. and viscosity index of 95 were mixed with 10 parts of refined Montan wax having a wax melting point of 164° F. The mixture was heated to 180° F. while being stirred and after becoming totally fluid the melt was allowed to cool. The jelly product so formed had a jelly melting point of 136° F. and was of a pale, attractive color.

There are various known methods for deriving from petroleum, high-melting, substantially oil-free waxes suitable for use in the present invention. Among such methods are those in which the wax is extracted from the oil with a solvent and later separated from associated oil.

There are also various known methods for improving lubricating oils, and the invention contemplates the use of oils so improved. Among these processes may be mentioned those in which lubricating oil is refined by treatment with anhydrous aluminum chloride. Various lubricating oils originally having too low a viscosity index to make them desirable for use in the present invention may be treated by known processes for improving their viscosity indexes to make them suitable for use. Among such processes are those in which lubricating oil is treated with selective solvents to raise the viscosity index. Some lubricating oils, however, are suitable for use without being subjected to any of the treatments just described.

Not all high melting waxes are suitable for use alone in blending with the petroleum oils to form the thixotropic jellies of my invention. Suitable high melting waxes for use alone are those adapted to form permanent thixotropic jellies when mixed with oil in proper proportions. They should be added in such proportions as will give the resulting oil-wax mixture a jelly consistency and a jelly melting point of over 130° F.

As shown in Example VI, refined Montan wax may be used alone in small proportions to give a permanent thixotropic jelly of high melting point. Likewise, crude or refined Montan wax may be added in small amounts to stable oil-wax mixtures to raise their jelly melting points, but crude Montan wax is not suitable for use alone as it will not alone form permanent jellies with petroleum oil.

What I claim is:

1. A lubricating jelly of stable thixotropic character and having a jelly melting point of over 130° F., comprising a mixture of a wax having a wax melting point of over 150° F. and a normally liquid petroleum lubricating oil in such relative proportions as to give a thixotropic jelly, the jelly having a consistency like that of petrolatum while quiescent but temporarily liquefying during agitation.

2. The jelly of claim 1 wherein the wax comprises an oil-free amorphous wax derived from petroleum.

3. The jelly of claim 1 wherein the wax comprises a major proportion of an oil-free amorphous wax derived from petroleum and a minor proportion of petroleum ceresine.

4. The jelly of claim 1 wherein said petroleum lubricating oil is one having a viscosity index higher than 90.

5. A thixotropic lubricating jelly comprising a substantially oil-free, high melting amorphous wax derived from a petroleum oil in admixture with more than an equal part of a liquid petroleum lubricating oil with a viscosity index higher than the viscosity index of the oil from which the wax was derived, said amorphous wax having a wax melting point of over 150° F. and said jelly having a jelly melting point of over 130° F.

6. The jelly of claim 1 wherein the lubricating oil in admixture with the wax is oil obtained by treatment of a lubricating stock with aluminum chloride.

7. A jelly according to claim 1 wherein said lubricating oil has a viscosity of the order of 100 seconds S. U. V. at 100° F., said jelly having an apparent viscosity at 32° F. substantially lower than the viscosity of petrolatum.

8. The jelly of claim 1 wherein the ratio of said lubricating oil to said wax by weight is of the order of 61: 21.

9. A thixotropic lubricating jelly comprising a mixture of substantially oil-free, amorphous wax derived from petroleum and having a wax melting point of over 150° F., a lesser proportion of petroleum ceresine having a wax melting point of about 160° F. and a petroleum lubricating oil having a viscosity index higher than 90, said jelly having a jelly melting point of over 130° F.

10. The jelly of claim 1 wherein the oil is present in greater proportion than the wax.

11. An improved thixotropic lubricating jelly comprising a mixture of approximately 61 parts of a petroleum lubricating oil having a viscosity of the order of 100 seconds S. U. V. at 100° F. and a viscosity index of 95 with approximately 20 parts amorphous, oil-free wax derived from petroleum and having a wax melting point of 155° F., and 5 parts crude Montan wax having a wax melting point of approximately 170° F., said jelly having a jelly melting point of approximately 160° F. and an apparent viscosity appreciably lower than that of petrolatum.

12. A thixotropic lubricant of jelly consistency during quiescence, said lubricant comprising approximately 61 parts by weight of liquid petroleum lubricating oil, 20 parts by weight of amorphous, oil-free high-melting wax derived from petroleum, the wax having a melting point of about 155° F., and 10 parts by weight of petroleum ceresine having a melting point of about 160° F., the melting point of said jelly being about 140° F.

13. The composition of claim 12 wherein the petroleum lubricating oil has a viscosity of 100 seconds S. U. V. at 100° F. and a viscosity index of 95.

14. A thixotropic lubricant adapted for use as a packing grease and for general lubricating purposes, said lubricant being a jelly melting above 130° F., having a petrolatum-like consistency during quiescence but temporarily liquefying during agitation and being a solution of hard high melting wax solid at temperatures below about 155° F. in a normally liquid petroleum lubricating oil.

HENRY A. AMBROSE.